UNITED STATES PATENT OFFICE.

CARL HERMANN PETSCH, OF MORRISANIA, NEW YORK.

IMPROVEMENT IN COLORING COMPOUNDS, OR BREMEN BLUE.

Specification forming part of Letters Patent No. 131,297, dated September 10, 1872.

*To all whom it may concern:*

Be it known that I, CARL HERMANN PETSCH, of Morrisania, in the county of Westchester and State of New York, have invented a new and useful Improvement in Coloring Compounds; and I do hereby declare the following to be a full, clear, and exact description thereof, which will enable those skilled in the art to make and use the same.

This invention relates to a coloring compound; and consists in a new method and composition of materials for producing the article known in the market as "Bremen blue." The invention consists in making the coloring compound from sulphate of copper combined with sulphate of zinc dissolved in water, caustic soda or potash being used as a precipitant.

In carrying out my invention, I take of sulphate of copper (blue vitriol) five parts by weight, and of sulphate of zinc (vitriol of zinc) one part by weight, and dissolve them together in water. To this solution I then add caustic soda or potash, dissolved in water, as a precipitant. The soda unites with the sulphuric acid, forming sulphate of soda, and the coloring material, consisting of the oxides of copper and of zinc, is precipitated. I do not confine myself to these proportions. The proportions here given produce a coloring compound possessing good covering qualities, but if the proportion of zinc be increased the covering quality of the paint will also be increased, as, within proper limits, the greater the quantity of the zinc ingredient the heavier the paint coats.

After the coloring matter is precipitated, I pour off the liquid and wash the precipitate, and then dry it, when it is ready for market. When mixed with oil it produces a dark green color of a lasting character.

What I claim as new, and desire to secure by Letters Patent, is—

A coloring compound produced from the sulphates of copper and zinc, substantially as described.

This specification signed by me this 10th day of August, 1872.

C. H. PETSCH.

Witnesses:
   J. VAN SANTVOORD,
   C. WAHLERS.